United States Patent
Sinclair et al.

(10) Patent No.: US 6,721,094 B1
(45) Date of Patent: Apr. 13, 2004

(54) LONG WORKING DISTANCE INTERFERENCE MICROSCOPE

(75) Inventors: Michael B. Sinclair, Albuquerque, NM (US); Maarten P. DeBoer, Albuquerque, NM (US); Norman F. Smith, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/800,047

(22) Filed: Mar. 5, 2001

(51) Int. Cl.[7] ............................. G02B 21/22; G01B 9/02
(52) U.S. Cl. ..................... 359/386; 359/368; 356/345; 356/351; 356/358
(58) Field of Search .................. 359/363, 368–390; 356/345, 356, 358–382, 445

(56) References Cited

U.S. PATENT DOCUMENTS

| | | | |
|---|---|---|---|
| 4,818,110 A | | 4/1989 | Davidson ............... 356/358 |
| 4,869,593 A | | 9/1989 | Biegen ................. 356/495 |
| 4,978,219 A | * | 12/1990 | Bessho ................. 356/489 |
| 5,042,949 A | * | 8/1991 | Greenberg et al. ....... 356/345 |
| 5,127,614 A | * | 7/1992 | Etzold et al. .......... 248/127 |
| 5,956,141 A | | 9/1999 | Hayashi ................ 356/496 |
| 5,973,786 A | * | 10/1999 | Yoon et al. ............ 356/354 |
| 5,990,473 A | | 11/1999 | Dickey et al. ....... 250/231.13 |
| 5,995,227 A | * | 11/1999 | Velzel et al. .......... 356/360 |
| 6,208,415 B1 | * | 3/2001 | De Boer et al. ........ 356/491 |
| 6,226,089 B1 | * | 5/2001 | Hakamata .............. 356/432 |
| 6,522,407 B2 | * | 2/2003 | Everett et al. ......... 356/369 |

OTHER PUBLICATIONS

M. R. Hart, R. A. Conant, K. Y. Lau, and R. S. Muller, *Life Fellow, IEEE, Stroboscopic Interferometer System for Dynamic MEMS Characterization*, Journal of Microelectromechanical systems, vol. 9, No. 4, Dec. 2000, pp. 409–418.

M. Fujigaki, J. Morimoto, H Toda, "Small Displacement Analysis of Micro–Accelerometer by Integrated Phase Shifting Method", SPIE, vol. 3744, 0277–786X/99, pp. 101–108.

M. Pluta, "Advanced Light Microscopy, vol. 3, Measuring Techniques", PWN—Polish Scientific Publishers, 1993, pp. 328–341.

M. Totzeck, H. Jacobsen, H. J. Tiziani, "Phaseshifting Polarization Interferometry for Microstructure Inspection", SPIE, vol. 3744, 0277–786X/99, pp. 75–85.

M. B. Sinclair, M. P. DeBoer, N. F. Smith, B. D. Jensen and S. L. Miller, "Method and System for Automated On–Chip Material and Structural Certification of MEMS Devices" U.S. patent application 09/553,989.

D. M. Gale, M. I. Pether, and J. C. Dainty, "Linnik Microscope Imaging of Integrated Circuit Structures," Applied Optics, vol. 35, No. 1, Jan. 1996, pp 131–137.

W. Hemmert, M. S. Mermelstein and D. M. Freeman, "Nanometer Resolution of Three–Dimensional Motions Using Video Interference Microscopy," Paper presented at the IEEE International MEMS 99, Orlando, FL, Jan. 17–21, 1999.

M. R. Hart, R. A. Conant, K. Y. Lau and R. S. Muller, "Time–Resolved Measurement of Optical MEMS Using Stroboscopic Interferometry".

(List continued on next page.)

*Primary Examiner*—Thong Nguyen
(74) *Attorney, Agent, or Firm*—Robert D. Watson

(57) ABSTRACT

Disclosed is a long working distance interference microscope suitable for three-dimensional imaging and metrology of MEMS devices and test structures on a standard microelectronics probe station. The long working distance of 10–30 mm allows standard probes or probe cards to be used. This enables nanometer-scale 3-D height profiles of MEMS test structures to be acquired across an entire wafer. A well-matched pair of reference/sample objectives is not required, significantly reducing the cost of this microscope, as compared to a Linnik microinterferometer.

28 Claims, 4 Drawing Sheets

OTHER PUBLICATIONS

M. P. DeBoer, N. F. Smith, N. D. Masters, M. B. Sinclair and E. J. Pryputniewicz, *"Integrated Platform for Testing MEMS Mechanical Properties at the Wafer Scale by the ImaP Methodology"*, A paper for the ASTM symposium on the Mechanical Properties of StructuralFilms, Orlando, FL, Nov. 15–16, 2000, pp 1–9.

*"Molecular Expressions Microscopy Primer Anatomy of the Microscope"*, http://micro.magnet.fsu.edu/primer/anatomy/objectives.html/.

* cited by examiner

LONG WORKING DISTANCE INTERFERENCE MICROSCOPE

CROSS-REFERENCE TO RELATED APPLICATIONS

This application is related to co-pending U.S. patent application "Method and System for Automated On-Chip Material and Structural Certification of MEMS Devices", by M. B. Sinclair et al., commonly assigned to Sandia Corporation, Albuquerque, New Mexico, USPTO Ser. No. 09/553,989.

FEDERALLY SPONSORED RESEARCH

The United States Government has rights in this/invention pursuant to Department of Energy Contract No. DE-AC04-94AL85000 with Sandia Corporation.

FIELD OF THE INVENTION

The present invention relates generally to the fields of microscopy and metrology, and more specifically to interference microscopes used for non-contact, ultra-high resolution optical profiling and metrology of integrated circuits and MEMS devices.

BACKGROUND OF THE INVENTION

Microelectromechanical systems (MEMS) devices are used for a variety of applications including optical switches and displays, microrelays, accelerometers, gyroscopes, image correctors, ink jet printheads, flow sensors, and medical devices. MEMS are fabricated in a fashion similar to microelectronics in the integrated circuit (IC) industry using surface micromachining techniques. Freestanding MEMS structures, such as pivoting mirrors, beamsplitters, lenses, gears, cantilevered beams, and motors, etc. are created at the end of the process flow by removing the oxide matrix surrounding thin film structural members. Polycrystalline silicon (i.e., polysilicon) is to date the most successful MEMS material because many requirements can be satisfied simultaneously. Other structural materials are in use or being explored, such as: aluminum, silicon carbide and "amorphous diamond".

Surface micromachining, LIGA techniques, and thin film techniques such as chemical vapor deposition, sputtering, or pulsed laser ablation can be used to form MEMS structures. For volume production, the same MEMS device will be repeatedly fabricated over the surface of a large diameter (4–12 inches) silicon wafer. Typically, there are fifty or more identical die sites. The microstructure of the resulting films and structures can exhibit cross-wafer non-uniformities, resulting in variations of thickness, height, residual stress, stress gradient, or elastic modulus across the wafer. Both mechanical and surface properties must be sufficiently well controlled to guarantee that the intended design function of the MEMS device is met across the entire wafer. For example, the resonant frequency of an electrostatic comb drive can be sensitive to small variations in residual stress. Also, highly curved comb drive fingers or suspensions (caused by stress gradient) will result in device malfunction. Furthermore, surface properties such as adhesion and friction are very sensitive to processing, and may exhibit cross-wafer non-uniformity as well. Poor quality control of surface properties may result in failure of devices that rely on contact or sliding of surfaces.

A need exists, therefore, for rapid and accurate, non-contact, three-dimensional imaging and metrology of complex features of MEMS structures (as well as other structures, such as thin films, microfluidic channels, and biological specimens). One conventional metrology technique is SEM. However, because of charging and calibration problems, it is difficult to obtain the required nanometer scale resolution by this technique. Other metrology techniques, such as AFM and contact profilometry, can provide the required nanometer-scale resolution to accurately measure 3-D out-of-plane features of IC's and MEMS devices, but either require extensive sample preparation, or rely on potentially destructive contact with the sample surface. Other non-contact techniques, such as conventional light microscopy, do not provide the required resolution.

In U.S. Pat. No. 5,990,473, Dickey and Holswade describe an apparatus and method for sensing motion of MEMS structures by reflecting or scattering light off of a corrugated surface (e.g., gear teeth) of a movable member (e.g., a gear). However, this system does not provide nanometer-scale measurement of the surface topography of the MEMS structures.

Optical interference microscopes (e.g., optical profilers) can provide the required accuracy (nanometers to sub-nanometers). These non-contact, non-destructive devices use quantitative interferometric phase-measurement techniques to determine the phase difference between an object point on the sample and a reference surface (typically an optically flat reference mirror). The measured phase difference is then converted into topological information. Computerized analysis of a series of interferograms taken while the reference phase of the interferometer is changed (e.g., by using phase-shifting interferometry) provides rapid and accurate determination of the wavefront phase encoded in the variations of the intensity patterns of the recorded interferograms, requiring only a simple point-by-point calculation to recover the phase. The use of phase-shifting interferometry (PSI) conveniently eliminates the need for finding and following fringe centers. PSI is also less sensitive to spatial variations in intensity, detector sensitivity, and fixed pattern noise. Using calibrated PSI, or similar computer analysis techniques, measurement accuracies as good as 0.1 nanometers can be attained if there are no spurious reflections from interfaces other than the one of interest.

It is highly desirable to perform metrology of IC's and MEMS devices at the wafer scale using a microscope setup on a conventional microelectronics probe station that can align wafers and move rapidly from one die site to the next. During electrical probing of a wafer on the probe station, released MEMS structures can be electrically activated; hence, their motion or mechanical behavior can be tested at the wafer scale (e.g., before the wafer is sliced into individual dies). Consequently, a need also exists for measuring out-of-plane deflections, oscillations, or other dynamic 3-D parameters of actuated MEMS devices with high accuracy and low cost. Electrical probing of the wafer requires a long working distance between the end of the microscope (e.g., tip of the sample objective) and the face of the wafer to permit access from the side of the wafer by a standard commercial electrical probe arm or probe card. The required working distance can be as large as 20–30 mm, depending on the number and size of probes needed to simultaneously reach across the wafer from the side.

Commercially available interference microscopes (e.g., the New View 5000 3-D Surface Profiler manufactured by Zygo, Inc., Middlefield, Conn., or the NT2000 3D Optical Profiler manufactured by Wyko, Inc. of Tuscan, Ariz.) do not have the necessary long working distance required for imaging MEMS structures while being actively probed.

Typically, commercial interference microscopes have a free working distance less than approximately 10 mm. This is because they use a special interferometer attachment (e.g., Mirau, Fizeau, or Michelson interference attachment), which contains a beamsplitter and reference mirror surface in a compact arrangement. The interferometer attachment is commonly located in-between the standard sample objective and the sample's surface. This arrangement unfortunately reduces the available free working distance to less than 10 mm (especially at higher magnifications, e.g., 20–50x). Additionally, in this configuration interference fringes cannot be easily obtained through a transparent window (such as might be found in a vacuum chamber) due to the phase shift induced by the window. A need exists, therefore, for an interferometric microscope that has a long working distance, and that can easily image through a transparent window.

Historically, the Linnik interference microscope (i.e., microinterferometer) has been used to provide a long working distance, including high magnification objectives having high numerical apertures. See U.S. Pat. No. 4,869,593 to Biegen; also U.S. Pat. No. 5,956,141 to Hayashi; also *Advanced Light Microscoy*, Vol. 3, by Maksymilian Pluta, Elsevier Science Publishers, Amsterdam, 1993, pp. 334–347.

FIG. 1 illustrates a schematic layout of a standard Linnik microinterferometer, which is based on a Michelson-type two-beam interferometer, and uses a pair of well-matched sample objectives. The illumination beam is split into two beams by means of a beamsplitter. The reference beam in the reference arm is directed onto and reflects off of a reference surface (i.e., the reference mirror). The object beam (i.e., sample beam) in the sample arm (i.e., sample circuit) impinges onto and then reflects off of the sample's surface (e.g., MEMS device). The two beams are then recombined after passing back through the beamsplitter, thereby forming an interferometric image (i.e., interferogram) of the sample's surface at the image plane of the microscope.

Most commercially available interference microscopes utilize an incoherent source of light, which limits the coherence length to approximately. 50 $\mu$m. With such a short coherence length, the optical path lengths of the reference arm and the object/sample arm must not differ by more than approximately 5 $\mu$m in order to achieve high contrast interference fringes. An additional requirement is that straight interference fringes be obtained when viewing a sample having an optically flat surface. This requirement is only satisfied when the divergence of the reference beam precisely matches that of the sample beam. When using incoherent light, these two requirements imply that the focal lengths and optical path lengths of the first objective in the sample arm and the second objective in the reference arm must be precisely matched. These requirements are satisfied in a standard Linnik interferometric microscope by optically testing a batch of sample objectives and selecting well-matched pairs of objectives. As illustrated in FIG. 1, a pair of well-matched objectives is used to produce high-contrast interference fringes with minimum curvature. It is difficult and, hence, expensive to obtain two closely matched long working distance (LWD) sample objectives, especially at high magnification (e.g., 50X). In addition, changing the overall magnification of the microscope (e.g., from 5X to 20X) requires that two objectives be changed, which is time-consuming and expensive. However, the requirement for equal divergence (i.e., wavefront curvature) of the two beams remains.

The use of laser illumination in a Linnik interference microscope can alleviate the problems associated with mismatched optical path lengths because of the long coherence lengths characteristic of laser light. Using laser light, high quality interferograms can be obtained, even when the reference and the sample arms have substantially different optical path lengths.

Gale, et al. describe a Linnik microscope capable of illumination by one of two different'sources, namely, a tungsten halogen lamp or a helium-neon laser (see D. M. Gale, M. I . Pether, and J. C. Dainty, "Linnik Microscope Imaging of Integrated Circuit Structures", Applied Optics Vol. 35, No. 1, January, 1996, pp. 131–137). However, this system uses a pair of well-matched sample objectives (with an aberration less than lambda/8), because this is required when the incoherent tungsten halogen lamp is used (i.e., due to the requirement for matching both the optical path lengths and beam divergence when using incoherent light).

The need remains, therefore, for a long working distance interference microscope that does not require the use of an expensive, well-matched pair of sample objectives. A need exists, also, for an interference microscope that uses an inexpensive reference beam circuit that requires only minor adjustments when changing magnifications. There is also a need for allowing imaging through a glass window, requiring only minor adjustments of the reference beam circuit. Against this background, the present invention was developed.

BRIEF DESCRIPTION OF THE DRAWINGS

The accompanying drawings, which are incorporated in and form part of the specification, illustrate various examples of the present invention and, together with the description, serve to explain the principles of the invention.

BRIEF SUMMARY OF THE INVENTION

The present invention relates to a long working distance interference microscope suitable for three-dimensional imaging and metrology of MEMS devices and test structures on a standard microelectronics probe station. The long working distance of 10–30 mm allows standard probes or probe cards to be used. This enables nanometer-scale 3-D height profiles of MEMS test structures to be acquired across an entire wafer. In contrast to a Linnik microinterferometer, which requires the use of two optically-matched microscope objectives, embodiments of the present invention do not require the use of two optically-matched microscope objectives, resulting in significantly reduced costs.

DETAILED DESCRIPTION OF THE INVENTION

Figure 1:
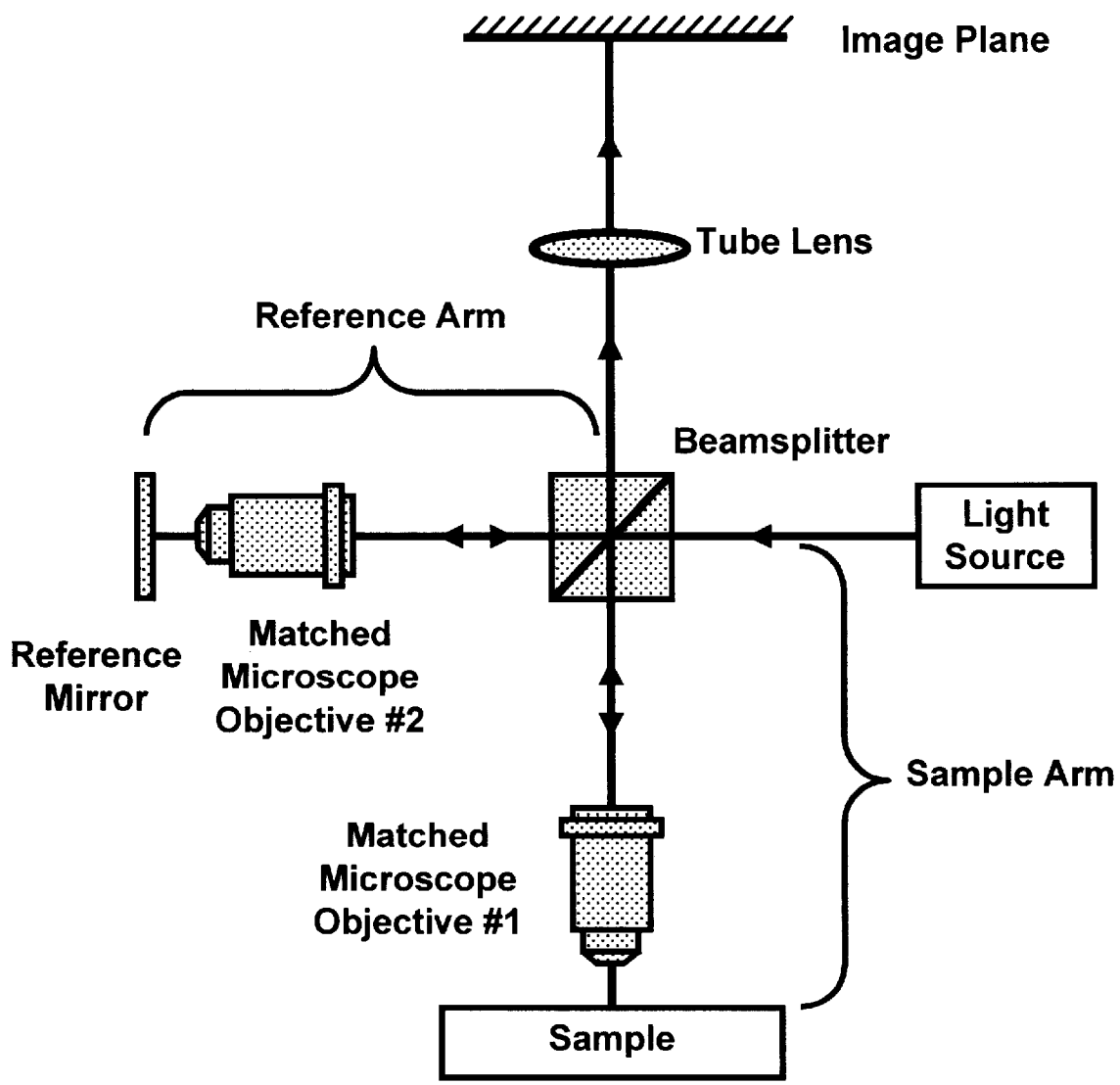
FIG. 1 (prior art) illustrates a schematic layout of a Linnik microinterferometer.

FIG. 1 illustrates a schematic layout of a well-known Linnik microinterferometer, which is based on a two-beam Michelson interferometer. The Linnik microinterferometer requires a pair of well-matched sample objectives when operated with an incoherent light source.

Figure 2:
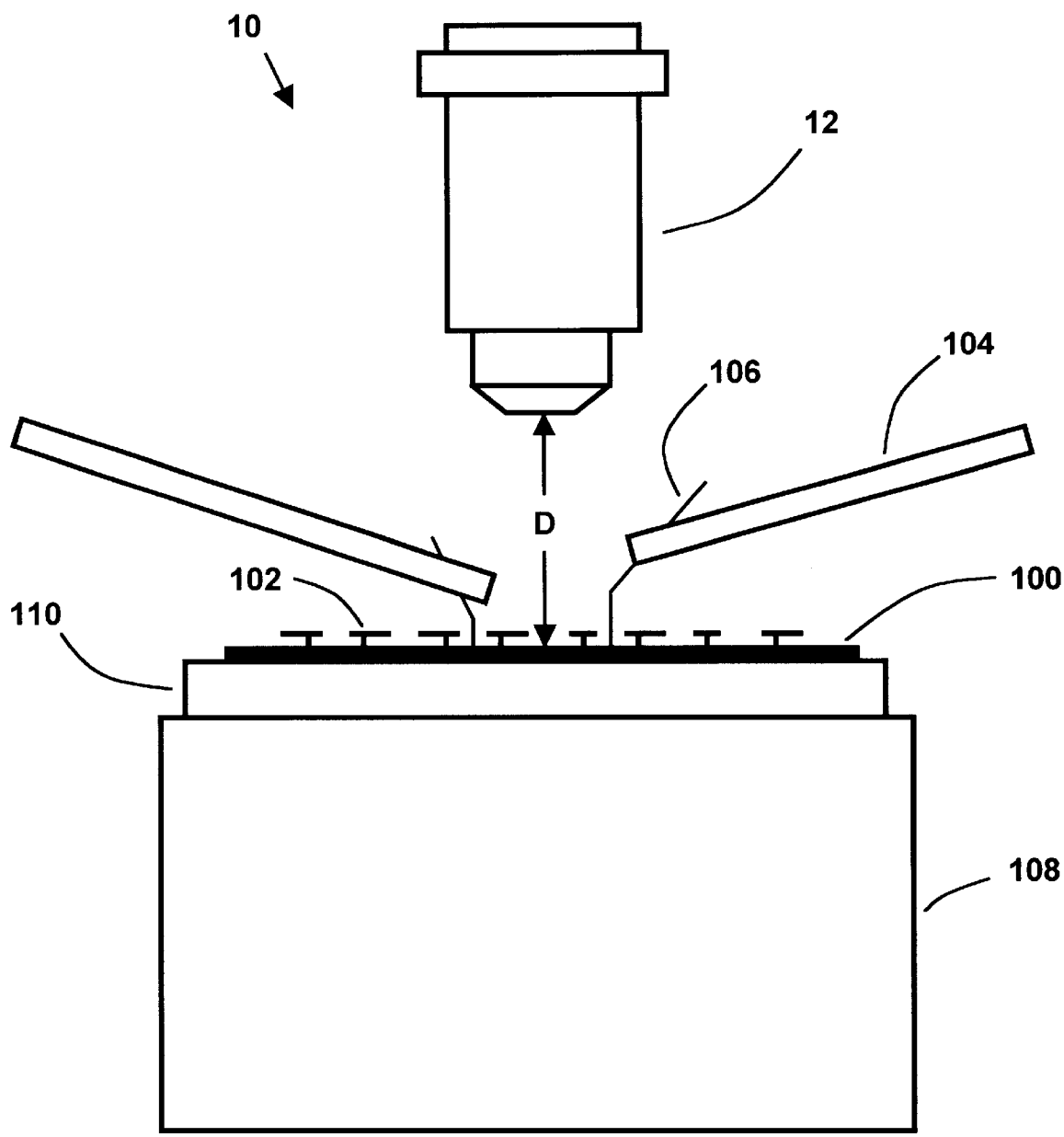
FIG. 2 illustrates a schematic side view of a first example of an application of a long working distance interference microscope, according to the present invention.

FIG. 2 illustrates a schematic side view of a first example of an application of a long working distance interference microscope, according to the present invention. Microscope 10 has a long working distance (LWD) sample objective 12, with its tip located at a distance "D" above the surface of silicon wafer 100. Wafer 100 has MEMS structures 102 surface micromachined on its surface. Wafer 100 is held in place by a positioning stage 110, which is part of a microelectronics probe station 108. Microelectronic probe arm 104 holds probe tip 106, which touches the surface of wafer 100 and activates selected MEMS elements 102. Using commercially available probes 104 (or probe cards, not shown), a minimum working distance "D" equal to 10–30 mm is required to provide adequate access from the side of wafer 100.

Figure 3:
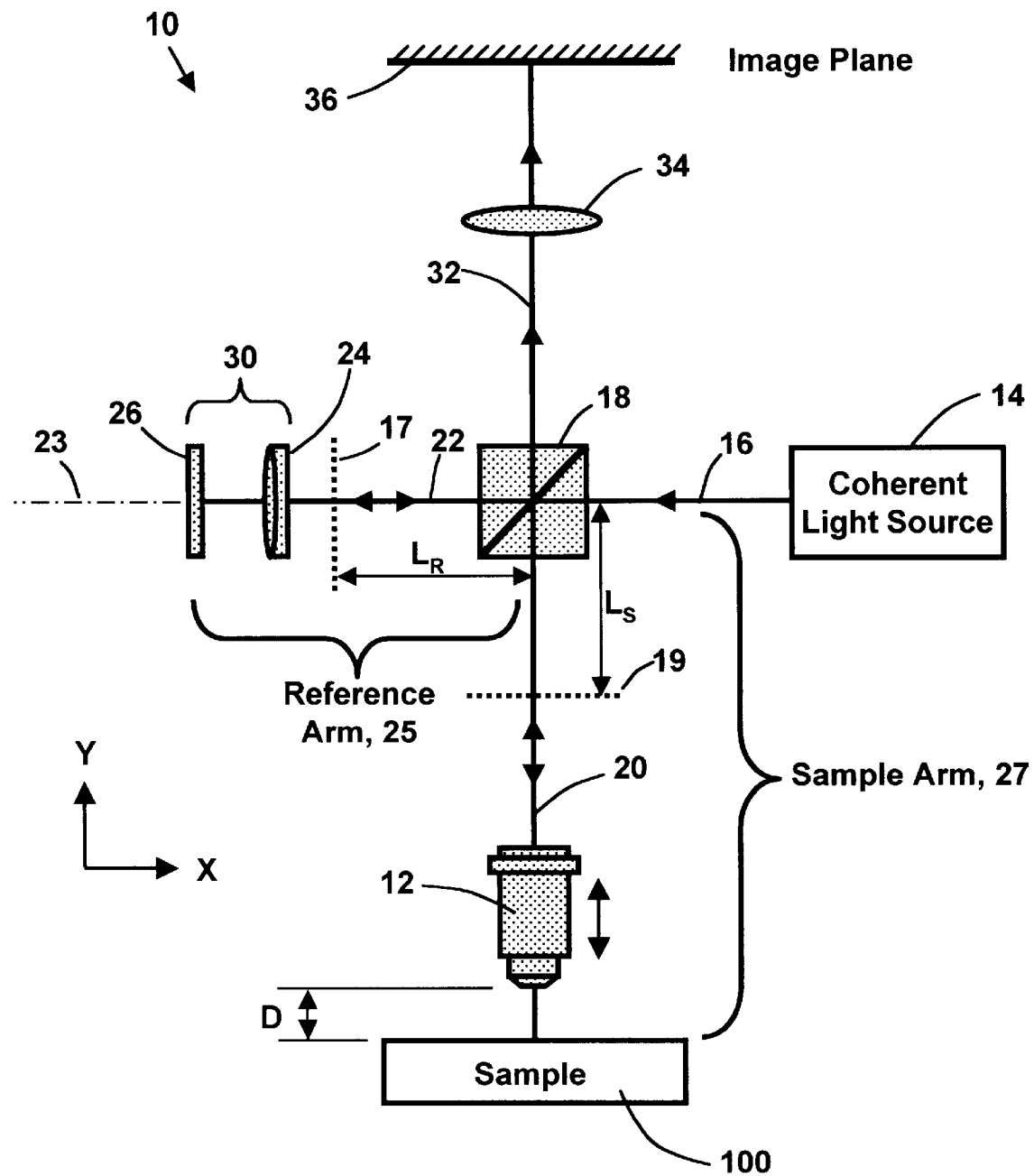
FIG. 3 illustrates a schematic layout of a second example of a long working distance interference microscope, according to the present invention.

FIG. 3 illustrates a schematic layout of a second example of a long working distance interference microscope, according to the present invention. The present invention is based on a two-beam Michelson-style interferometer, having a reference arm 25 and a sample arm 27 (i.e., object arm). The surface of sample 100 is positioned at the front focal point of sample objective 12. The position of sample 100 relative to objective 12 can be adjusted to achieve a sharp front focus. Illumination light beam 16 is generated by a coherent light source 14, for example, by a laser or by a synchrotron light source. Illumination beam 16 impinges upon beamsplitter 18, which splits beam 16 into a sample beam 20 and a reference beam 22. Sample beam 20 passes through objective 12 and illuminates the surface of sample 100. Reference beam 22 passes through reference objective 24 and impinges on an optically flat reference mirror 26 located in the front focal plane of objective 24. The centerline of reference beam 22 coincides with the optical axis 23 of the reference arm 25, which also coincides with the centerline of reference objective 24. Optical axis 23 is oriented parallel to the X-axis. Light reflecting from reference mirror 26 passes back through reference objective 24 and reflects off beamsplitter 18 to form the reference part of image beam 32. Similarly, light reflecting from sample 100 passes back through objective 12 and through beamsplitter 18 to combine with the reference part of image beam 32, thereby producing interference fringes. Image beam 32 (containing the interference fringes) can pass through tube lens 34, which forms a real image of both the surface of sample 100 and the surface of the reference mirror 26 at the image plane 36. An imaging device (not shown) can be placed in the image plane 36 to capture, display, or record the image. A processor (not shown), such as a computer using image-processing software, can process the output of the imaging device and provide a topographic profile of the surface of sample 100.

Unlike the Linnik microinterferometer described previously in FIG. 1, the interference microscope 10 of the present invention does not require the use of a pair of well-matched sample objectives. In the present invention, the use of coherent laser light (with its long coherence length) eliminates the requirement for precise snatching of the optical path lengths of the reference arm 25 and the sample arm 27. Therefore, a simple reference objective 24 (such as a doublet lens, a triplet lens, or an achromatic lens with low spherical aberration) can successfully replace one of the two well-matched objectives in a standard Linnik microscope, without any loss of Performance, and with a substantial savings in cost. Nevertheless, the divergence i.e., wavefront curvature) of reference arm 25 must match the divergence of sample arm 27 in order to obtain straight interference fringes. This is achieved by matching the distance, $L_R$, between the back focal plane 17 of reference objective 24 and beamsplitter 18 with the distance, $L_S$, between the back focal plane 19 of objective 12 and beamsplitter 18. Equivalently, the divergence of the two arms 25, 27 is matched when $L_R=L_S$.

Referring still to FIG. 3, interference microscope 10 can be supported on a vibration isolation table (not shown) to reduce undesirable vibrations. Laser 12 can be a 532 nm (green light) diode pumped, frequency doubled Nd:YAG laser, having a coherence length greater than 100 meters. The choice of green light (e.g., 532 nm) is particularly useful because MEMS structures made of polysilicon are opaque and reflective at this wavelength. Additionally, commercially available optics are typically manufactured to have minimal spherical aberration errors at the wavelength of green light, since green light is near the center of the visible spectrum. Sample objective 12 can be a long working distance (LWD), infinity-corrected, Plan-Apo 10X objective, with a 33 mm working distance (e.g., Mitutoyo M Plan Apo 10X).

Referring still to FIG. 3, the position of objective 12 (or, alternatively, the position of sample 100 relative to objective 12) can be moved axially along the sample arm's optic axis (i.e., parallel to the Y-axis) to adjust the front focal point of objective 12. Objective 12 can also be moved to adjust the position of its back focal plane 19 ralative to beamsplitter 18 (i.e., to adjust $L_S$). Likewise, the axial position (i.e., parallel to the X-axis) of reference objective 24 can be moved along the reference arm's optic axis 23 to adjust the position of its back focal plane 17 relative to beamsplitter 18 (i.e., to adjust $L_R$). Straight interference fringes can be obtained when $L_R=L_S$. Additionally, the relative distance between reference mirror 26 and reference objective 24 can be independently adjusted to achieve a sharp front focus at the front focal plane of reference objective 24.

Referring still to FIG. 3, reference mirror 26 and reference objective 24 can be grouped together to form reference assembly 30. Assembly 30 can be rigidly translated as a single unit to adjust the axial position of the back focal plane of reference objective 24, thereby allowing the divergence of reference beam 22 to be adjusted to precisely match the divergence of sample beam 20. In this manner, straight interference fringes may be obtained.

When objective 12 is changed to provide a different magnification power (e.g., when changing from 5X to 10X), small adjustments of the axial position of the back focal plane 17 of reference assembly 30 can be made to obtain straight interference fringes. This can be accomplished by rigidly translating reference assembly 30 along the optic axis 23.

Figure 4:
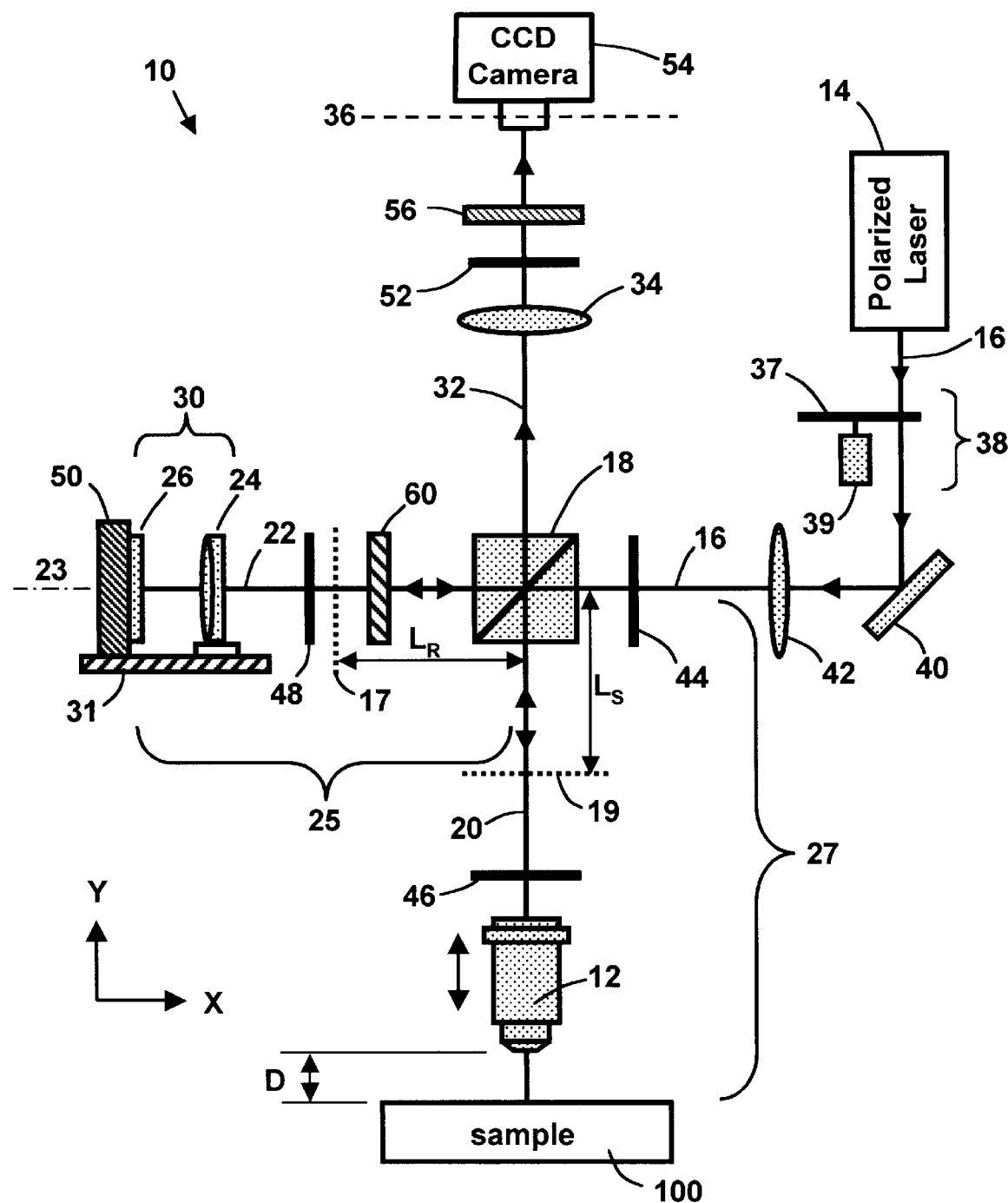
FIG. 4 illustrates a schematic layout of a third example of a long working distance interference microscope, according to the present invention.

FIG. 4 illustrates a schematic layout of a third example of a long working distance interference microscope, according to the present invention. Microscope 10 comprises a reference arm 25 and a sample arm 27 (i.e., object arm). Laser 14 generates an illumination beam 16 of polarized, coherent light. Beam 16 passes through diffuser 38. Diffuser 38 improves image quality when using laser illumination by reducing spatial coherence of the laser source, without impacting the temporal coherence (i.e. the coherence length) of the laser radiation. Diffuser 38 can comprise a ground glass disk 37 rotated at high RPM by a motor 39. If disk 37 were stationary, an image with a large amount of undesirable laser speckle would be produced at image plane 36. However, rotating ground glass disk 37 causes a rapid averaging of the speckled images, resulting in an image quality that is comparable to that obtained with incoherent illumination, while being free of spatial coherence artifacts.

Referring still to FIG. 4, after passing through diffuser 38, illumination beam 16 then reflects off turning mirror 40 and then passes through converging lens 42, which collects the laser light scattered from diffuser 38 and focuses the light at or near the jack focal plane 19 of sample objective 12 in sample arm 27. Illumination beam 16 Illuminates beamsplitter 18, which splits beam 16 into a sample beam 20 and a reference beam 22. A one-half (½) waveplate 44 (i.e., ½ wave retardation plate) an be inserted in-between converging lens 42 and beamsplitter 18. One-half waveplate 44 can be used to adjust the splitting ratio of beam intensities between sample arm 27 and reference arm 25. The highest quality interference fringes are generally obtained when the reflected beams in the two arms have approximately equal intensity. Beamsplitter 18 can be a polarizing beamsplitter cube. Polarizing beamsplitter cube 18 splits the incident beam into two beams according to the incident polarization; P-polarized light is transmitted and S-polarized light is reflected. One-quarter (¼) waveplate 46 can be inserted between beamsplitter 18 and objective 12 to allow all of the light reflected from the surface of sample 100 to pass through beamsplitter 18 and onto the imaging section of the microscope 10 (e.g., tube lens 34 and CCD Camera 54). Likewise, one-quarter (¼) waveplate 48 can be inserted between beamsplitter 18 and reference mirror 26 to allow all of the light reflected from mirror 26 to pass through beamsplitter 18 and onto CCD camera 54. Polarized optics are generally useful to reduce optical feedback into the laser source 14.

Referring still to FIG. 4, the position of objective 12 (or, alternatively, the position of sample 100 relative to objective 12) can be moved axially along the sample arm's optic axis (i.e., parallel to the Y-axis) to adjust the front focal point of objective 12. Objective 12 can also be moved to adjust the position of its back focal plane 19 relative to beamsplitter 18 (i.e., to adjust $L_S$). Likewise, the axial position (i.e., parallel to the X-axis) of reference objective 24 can be moved along the reference arm's optic axis 23 to adjust the position of its back focal plane 17 relative to beamsplitter 18 (i.e., to adjust $L_R$). Straight interference fringes can be obtained when $L_R=L_S$. Additionally, the relative distance between reference mirror 26 and reference objective 24 can be independently adjusted to achieve a sharp front focus at the front focal plane of reference objective 24.

Referring still to FIG. 4, microscope 10 can include means for simultaneously translating the axial position (i.e., the position along the X-axis in FIG. 4) of reference mirror 26 and reference objective 24 along the optic axis 23 of reference arm 25. Means for simultaneously translating the axial position of reference mirror 26 and reference objective 24 can include a single movable platform or stage 31, on which both mirror 26 and objective 24 are mounted. Alternatively, means for simultaneously translating the axial position of reference mirror 26 and reference objective 24 can comprise, for example, a rack and pinion positioning mechanism, a screw-driven positioning mechanism, or a pair of coaxial tubes that displace their position relative to each other (such as in a camera zoom lens assembly). Alternatively, mirror 26 and objective 24 can each be mounted on separate, independently movable translation means, whose motion can be coordinated by a motion controller unit to effect simultaneous translation of both mirror 26 and objective 24, or independent motion, as needed. The translation means can be manually operated, or remotely operated via motor-driven screws, gears, etc. under computer control.

Referring still to FIG. 4, mirror 26 is positioned in the front focal plane of objective 24. Stage 31 can be rigidly translated along the optic axis 23 to properly position the back focal plane of reference objective 24 so that straight interference fringes are obtained. This adjustment can also be used to compensate for the displacement of the back focal plane 19 of objective 12 that occurs when the sample 100 is viewed through a transparent window (not shown), thereby allowing straight interference fringes to be produced. This capability (i.e., imaging through a glass window), can be important for viewing a device inside of a vacuum chamber, or contained in a package sealed with a glass lid, such as a package for housing a MEMS device. Reference mirror 26 can be mounted on a 3-axis, voltage-controlled piezoelectric transducer (PZT) platform 50, which can be mounted on movable stage 31. PZT platform 50 can provide very fine position adjustment in multiple directions, e.g., translating along the optic axis 23, and/or tilting around two, orthogonal axes.

When objective 12 is changed to provide a different magnification power e.g., when changing from 5X to 10X), small adjustments of the axial position of the back focal plane 17 of reference assembly 30 can be made to obtain straight interference fringes. This can be accomplished by rigidly translating stage 31 along optic axis 23.

Referring still to FIG. 4, polarizer 52 can be inserted in-between beamsplitter 18 and imaging plane 36 (e.g., CCD Camera 54). The polarization direction of polarizer 52 can be oriented to select parallel-polarized, equal-intensity components of each of the orthogonally-polarized return beams (i.e., the return sample beam and the return reference beam). Use of polarizer 52, therefore, allows the formation of interference fringes in the combined image beam 32 when viewed at image plane 36. CCD camera 54 can be placed at image plane 36, which records the interference images (i.e., interferograms) for output to a monitor, display, or for subsequent digitization by a frame-grabber and image analysis software (e.g., for 3-D height measurement by phase-shifting interferometry). Since the level of illumination of sample 100 is very bright when using a laser source, CCD camera 54 can be operated at a high frame rate; for example, 50,000 frames per second, with a 10 microsecond exposure time. Very expensive ultra high-speed CCD cameras exist that can capture 1 nanosecond events for up to 8 frames. Other image capture devices can be used in place of CCD camera 54, for example, a photomultiplier tube, a film-based camera, a TV monitor, or an eyepiece/ocular set.

Referring still to FIG. 4, a stroboscopic shutter 56 can be placed in the path of image beam 32 to provide stroboscopic illumination of CCD camera 54, useful for imaging vibrating structures or surfaces. Additionally, beam stop shutter 60 can be placed along the reference arm optical axis 23 to stop reference beam 22 from forming interference fringes in image beam 32.

In experiments that we performed using a version of the present invention, we have achieved a working distance of approximately 30 mm with a 10x objective; and approximately 13 mm with a 50x objective, while obtaining high quality, high contrast, interferograms of MEMS structures. The same reference objective 24 was used for both the 10x and 50x observations, which required making only a small adjustment of the axial position of stage 31.

Referring to FIGS. 3 and 4, the present invention comprises a method for changing the magnification power of interference microscope 10 and, then, performing minor adjustments to achieve straight interference fringes. A first example of the method comprises the steps of: replacing sample objective 12 with another objective 12' (not shown)

of a different magnification power; and then matching the divergence of the reference arm 25 and the sample arm 27. The step of matching the divergence of reference arm 25 and sample arm 27 can be accomplished by adjusting the distance ($L_R$) from the back focal plane 17 of reference objective 24 to beamsplitter 18 to match the distance ($L_S$) from the back focal plane 19 of sample objective 12 to beamsplitter 18. After making the adjustment, then $L_R=L_S$. Alternatively, the step of matching the divergence can be accomplished by simultaneously translating the axial position of reference mirror 26 and reference objective 24 along optic axis 23 of reference arm 25. This can be accomplished, for example, by translating the position of stage 31 (carrying reference mirror 26 and reference objective 24) along optic axis 23 of reference arm 25. The method can also include making very fine adjustments in the position and tilt of reference mirror 26 by actuating PZT platform 50.

The particular examples discussed above are cited to illustrate particular embodiments of the invention. Other applications and embodiments of the apparatus and method of the present invention will become evident to those skilled in the art. For example, the laser output can be coupled to the optical elements of interference microscope 10 by using an optical fiber, which can maintain polarization. Alternatively, laser 14 can be a tunable laser or a multi-wavelength laser system, which provides additional capabilities for interferometric imaging compared to a single-wavelength (e.g., monochromatic) laser source. By using two different requencies of laser light, thickness information across discontinuous step heights could be obtained. Alternatively, tube lens 34 in the imaging part of microscope 10 can include zoom-lens elements for providing a continuously adjustable magnification range of greater than twenty without changing objectives. Also, diffuser 38 could be replaced with a liquid crystal modulator, or a solid or liquid acousto-optic modulating cell, to eliminate any problems associated with vibrations caused by the rapidly rotating ground glass disk 37 of diffuser 38 when capturing images of transient phenomena.

The actual scope of the invention is defined by the claims appended hereto.

We claim:

1. A two-beam, full-field imaging interference microscope, comprising:

a source of coherent light;

a beamsplitter, optically aligned with the coherent light source;

a sample objective, optically aligned with the beamsplitter along a sample arm and disposed directly in front of a sample, for imaging the surface of the sample, whose surface is located at a front focal plane of the sample objective;

a reference mirror, optically aligned with the beamsplitter;

a reference objective, optically aligned with the beamsplitter along a reference arm, and disposed in-between the beamsplitter and the reference mirror and disposed directly in front of the reference mirror, for imaging the surface of the reference mirror, whose surface is located at a front focal plane of the reference objective;

image forming means, optically aligned with both the sample arm and the reference arm, and disposed on the opposite side of the beamsplitter from the sample objective, for forming at an image plane a combined real image of both the surface of the sample and the surface of the reference mirror, whereby said combined real image contains one or more interference fringes; and divergence matching means for matching the divergence of the reference and sample arms, comprising means for adjusting the position of the reference objective along the reference arm; whereby the distance, $L_R$, between the beamsplitter and a back focal plane of the reference objective can be adjusted to be equal to the distance, $L_S$, between the beamsplitter and a back focal plane of the sample objective; thereby producing straight interference fringes at the image plane when the divergence, $L_R$, of the reference arm matches the divergence, $L_S$, of the sample arm;

wherein the reference objective is not optically matched to the sample objective.

2. The interference microscope of claim 1, wherein the image forming means comprises a tube lens.

3. The interference microscope of claim 1, wherein the source of coherent light comprises a laser.

4. The interference microscope of claim 3, wherein the laser comprises a polarized, diode pumped, frequency doubled Nd:YAG laser.

5. The interference microscope of claim 1, wherein the reference objective comprises a simple lens selected from the group consisting of a doublet lens, a triplet lens, and an achromatic lens.

6. The interference microscope of claim 1, wherein the free working distance between the surface of a sample and the tip of the sample objective is between approximately 10 mm and 30 mm.

7. The interference microscope of claim 1, further comprising an imaging device disposed at the image plane.

8. The interference microscope of claim 1, further comprising means for simultaneously translating the axial position of the reference mirror and the reference objective along the optic axis of the reference arm.

9. The interference microscope of 8, wherein the means for simultaneously translating the axial position of the reference mirror and the reference objective comprises a single movable stage capable of translating its position along the optic axis of the reference arm, wherein both the reference mirror and the reference objective are mounted on the single movable stage.

10. The interference microscope of claim 1, further comprising:

a CCD camera disposed at the image plane wherein the source of coherent light comprises a laser;

and wherein the image forming means comprises a tube lens.

11. The interference microscope of claim 10, wherein the laser comprises a tunable laser or multi-wavelength laser system.

12. The interference microscope of claim 10, further comprising diffusing means for reducing the spatial coherence of the laser light source.

13. The interference microscope of claim 12, wherein the diffusing means comprises a rotating diffuser.

14. The interference microscope of claim 12, wherein the diffusing means comprises a liquid crystal modulator, or a solid or liquid acousto-optic modulating cell.

15. The interference microscope of claim 12, further comprising optical means for converging the light scattered from the diffusing means, disposed between the beamsplitter cube and the diffusion means.

16. The interference microscope of 15, wherein the optical means comprises a converging lens.

17. The interference microscope of claim 10, wherein the reference mirror is mounted on a three-axis piezoelectric transducer platform.

18. The interference microscope of claim 10, further comprising a beam stop shutter disposed in-between the reference mirror and, the beamsplitter.

19. The interference microscope of claim 10, further comprising a stroboscopic shutter disposed in front of the CCD camera.

20. The interference microscope of claim 1, further comprising:

an imaging device disposed at the image plane wherein the image forming means comprises a tube lens;

wherein the coherent light source comprises a polarized laser; and wherein the beamsplitter comprises a polarized beamsplitter cube.

21. The interference microscope of claim 20, further comprising a one-half wave retardation plate disposed in-between the beamsplitter cube and the light source.

22. The interference microscope of claim 20, further comprising a one-quarter wave retardation plate disposed in-between the beamsplitter cube and the sample objective.

23. The interference microscope of claim 20, further comprising a one-quarter wave retardation plate disposed in-between tile beamsplitter cube and the reference mirror.

24. The interference microscope of claim 20, further comprising a rotatable polarizer disposed in-between the beamsplitter cube and the imaging device.

25. The interference microscope of claim 20, wherein the tube lens comprises a zoom lens assembly.

26. The interference microscope of claim 20, wherein the source of polarized laser light comprises a tunable laser.

27. The interference microscope of claim 20, wherein the imaging device comprises a high speed CCD camera.

28. The interference microscope of claim 1, wherein the reference objective is located at a position where the distance between the beamsplitter and the back focal plane of the reference objective, $L_R$, is equal to the distance between the beamsplitter and the back focal plane of the sample objective, $L_S$; thereby producing straight interference fringes at the image plane.

* * * * *